Patented May 23, 1933

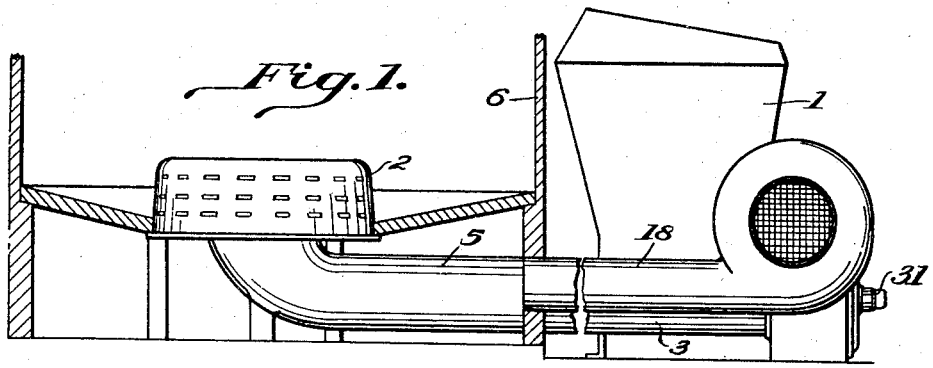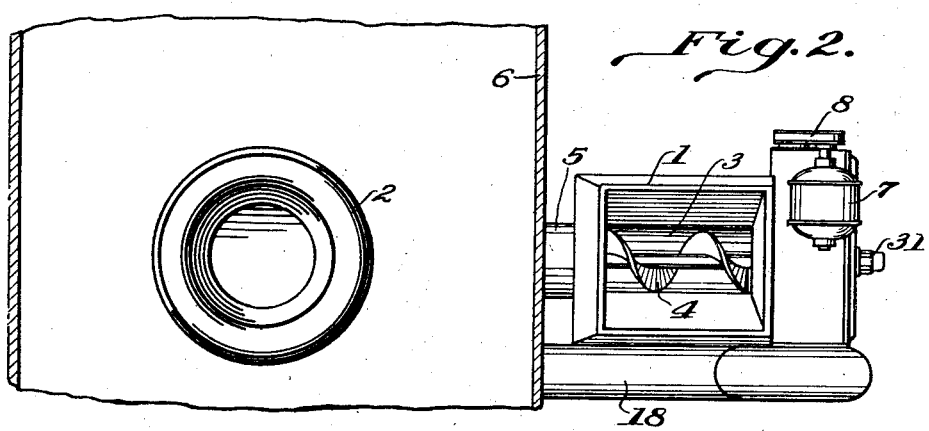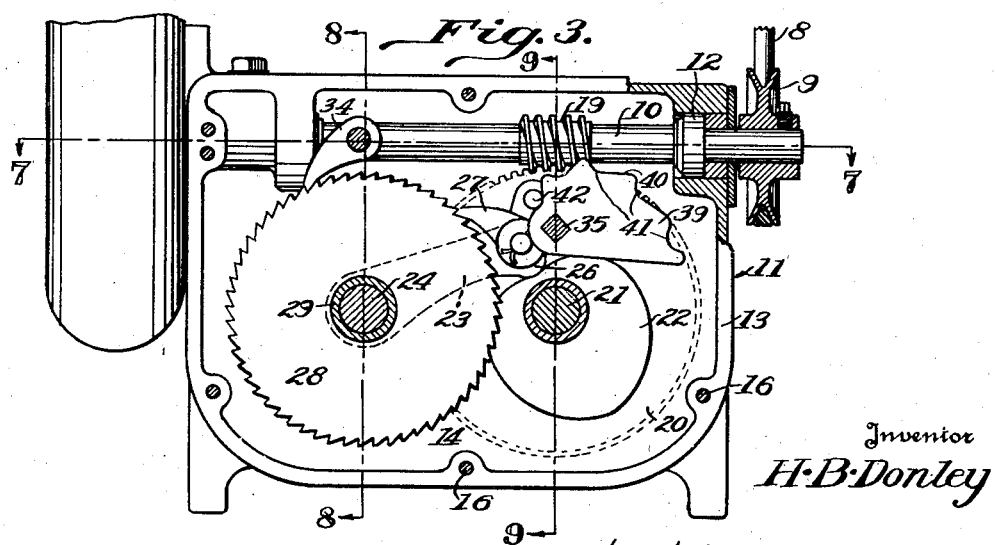

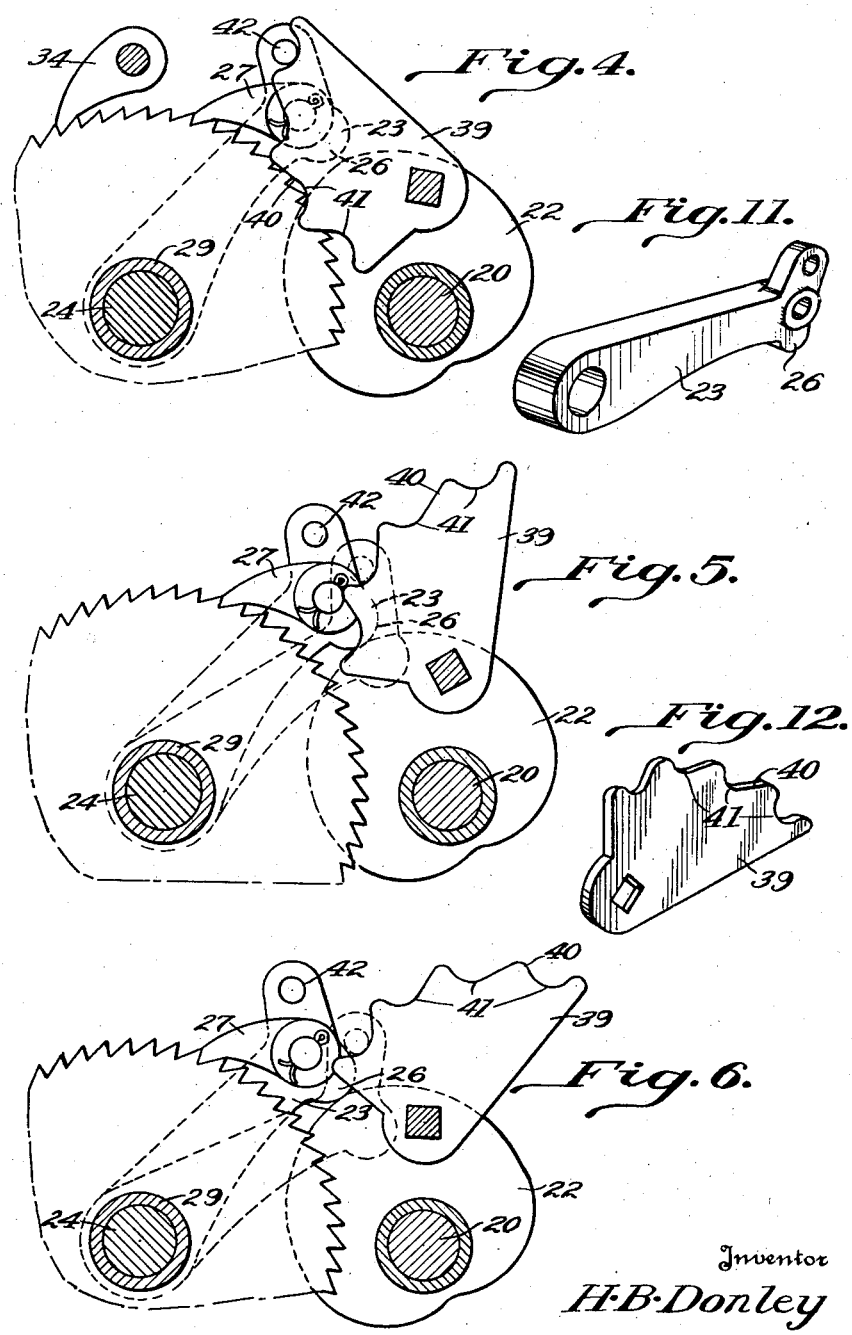

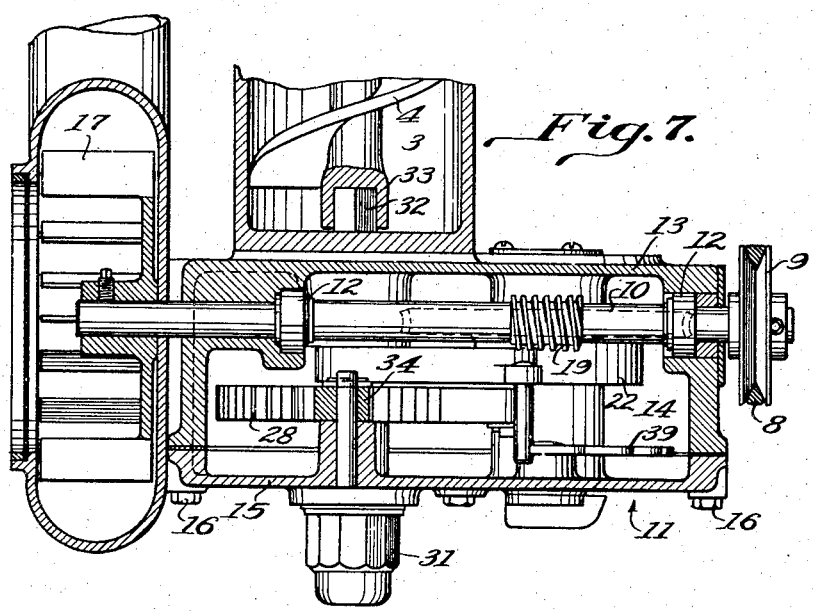
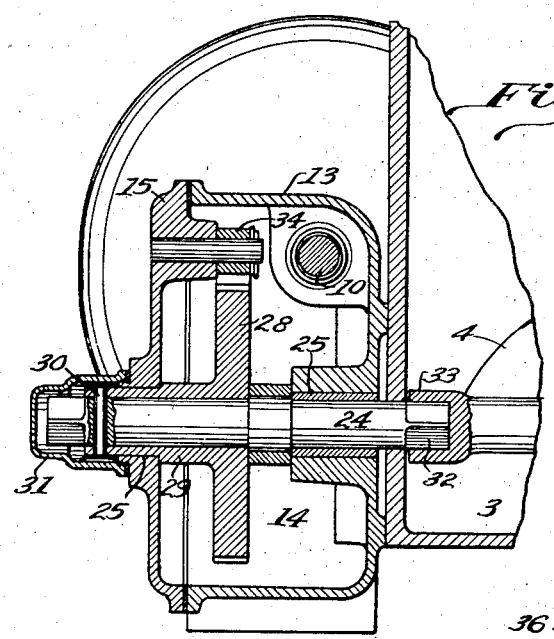
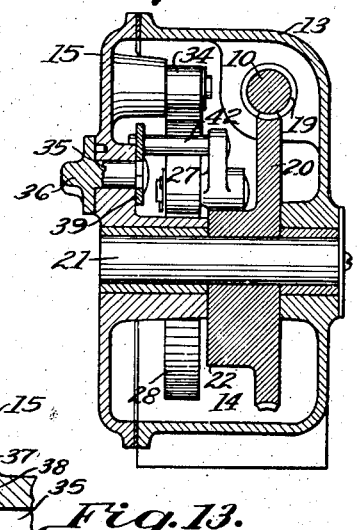
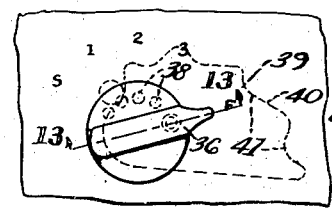

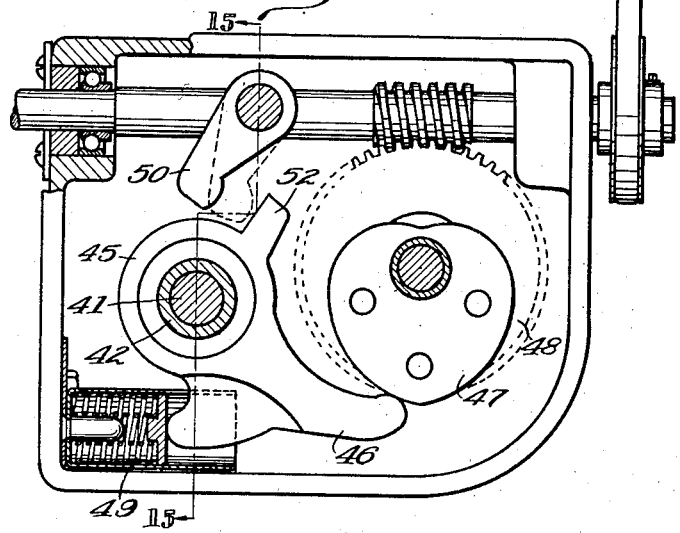
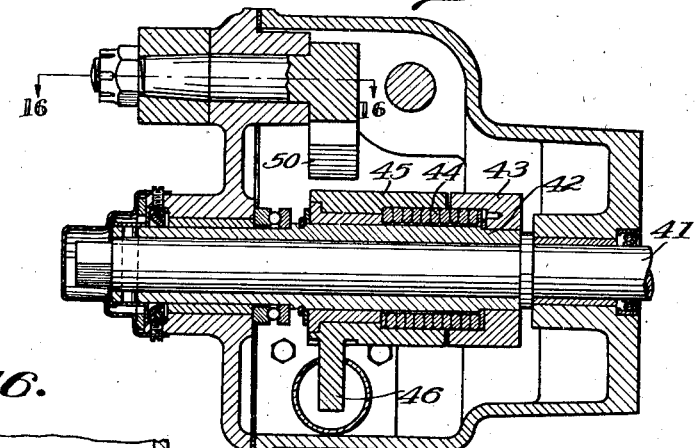
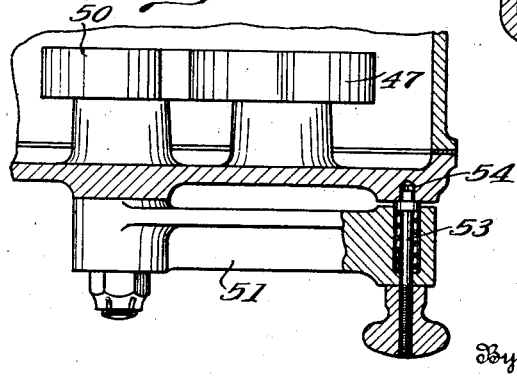

1,909,933

UNITED STATES PATENT OFFICE

HAROLD B. DONLEY, OF COLUMBUS, OHIO, ASSIGNOR TO COLUMBUS AUTO BRASS COMPANY, OF COLUMBUS, OHIO, A CORPORATION OF OHIO

VARIABLE SPEED TRANSMISSION

Application filed January 20, 1932. Serial No. 587,737.

This invention relates to improvements in variable speed transmissions and, more specifically, is directed to that class of transmissions wherein the constantly rotating driving member, revolving at a relatively high rate of speed and through associated instrumentalities, is employed to impart intermittent or step by step rotation to a driven member rotatable at a much lower rate of speed. My improved transmission is especially adapted for use in machinery employed for the effecting of relatively slow feeding operations and wherein use is made of an electric motor, or other relatively high speed prime mover, for imparting power to the machinery in which the transmission is embodied.

It is an object of my invention to provide an improved transmission which is particularly adapted for use in connection with mechanical stokers of the type employed for delivering fuels to combustion grates wherein coal is fed automatically from a magazine or hopper to an associated furnace in response to temperature requirements in the rooms of a residence or building, the transmission serving through simple manual adjustment, to control at will the rates of delivery of the fuel to the grate or furnace structure without varying the speed of the motor.

It is another object of the invention to provide a speed reducing transmission of the character indicated which is formed to include a driving member comprising a cam and wherein the driven member is equipped with a ratchet wheel, the follower of the cam being pivotally movable about the axis of rotation of the ratchet wheel and has its free end arranged for contacting engagement with the periphery of the cam, whereby the rotation of the cam will impart oscillatory motion to the follower, the free end of the latter being provided with a pawl arranged to engage with the teeth of the ratchet wheel, and there being manually adjustable stop means mounted in connection with the transmission and movable into the path of motion of the follower in order to control the contacting engagement of the follower with the cam and to thereby vary the effective throw of the follower in advancing the ratchet wheel and associated driven member in an intermittent or step by step manner.

For a further understanding of the improved variable speed transmisison comprising the present invention, reference is to be had to the following description and the accompanying drawings, wherein:

Fig. 1 is a view in side elevation, partly in vertical section of a mechanical stoker unit wherein my improved speed transmission is embodied;

Fig. 2 is a top plan view of the stoker unit;

Fig. 3 is a view partly in vertical section and side elevation of my improved transmission. In this figure, the manually adjustable stop means is disclosed in a position permitting of full feed or maximum speed of the driven member of the transmission.

Fig. 4 is a diagrammatic view disclosing the stop means in a position wherein the driven member is idle and removed from coaction with the driving cam;

Fig. 5 is a similar view disclosing the stop means in a third position wherein the driving cam coacts with its follower to permit of but limited travel of the ratchet wheel connected with the driven member;

Fig. 6 is a similar view disclosing the stop member in a fourth position permitting of somewhat greater travel of the ratchet wheel on the driven member in response to the rotation of the driving cam;

Fig. 7 is a horizontal sectional view taken through the transmission as indicated by line 7—7 of Fig. 3 and disclosing the feed auger or conveyor which is connected with the driven member of the transmission;

Fig. 8 is a vertical sectional view taken on the line 8—8 of Fig. 3;

Fig. 9 is a similar view taken on the line 9—9 of Fig. 3;

Fig. 10 is a detail view setting forth the mechanism for maintaining the adjustable stop means in its various positions of adjustment;

Fig. 11 is a detail view of the follower;

Fig. 12 is a similar view of the manually adjustable serrated stop plate;

Fig. 13 is a detail sectional view on the line 13—13 of Fig. 10;

Fig. 14 is a vertical sectional view taken through a slightly modified form of transmission mechanism;

Fig. 15 is a transverse vertical sectional view taken on the line 15—15 of Fig. 14;

Fig. 16 is a fragmentary horiontal sectional view taken on the line 16—16 of Fig. 15.

In the specific embodiment of the invention set forth in the accompanying drawings and hereinafter described in detail, my improved variable speed transmission is used in association with mechanical fuel stokers of the type employed in the heating of residences, buildings and the like. Generally, these stokers comprise a hopper 1 in which the fuel supplied to the tuyère grates 2 is received. In the bottom 3 of the hopper there is arranged an auger or screw conveyor 4, which is rotated, as later explained, to advance the fuel through a feeding conduit 5 which leads to the bottom of the grate structure 2 disposed within the confines of a heating furnace 6. In this case, the grate 2 is of the so-called under-fed type.

In order to effect the rotation of the conveyor to feed a controllable amount of fuel to the grate, use is made of an electric motor 7. The armature shaft of this motor is provided with a pulley over which is trained a belt 8, the latter being also trained around a sheave wheel 9 mounted on the driving shaft 10 of the variable speed transmission 11 comprising the present invention.

The shaft 10 is supported for rotation in suitable bearings 12 provided in conjunction with the main body casting 13 of the transmission casing. The casting 13 provides an internal chamber 14 within the casing, and this chamber is normally closed by a removable side plate 15 which is attached to the body casting by means of threaded fastening elements 16. The end of the shaft 10, opposite to the sheave wheel 9, projects through the casting 13 and is directly connected with the rotor 17 of a blower fan. The outlet of this fan includes a conduit 18 which leads to the grate 2 for the purpose of facilitating combustion of the solid fuels which are substantially automatically supplied to the grate, as will be understood.

Formed with the driving shaft 10 is a worm 19 which is positioned to mesh with the teeth of a worm gear 20 mounted for rotation on a counter shaft 21 carried transversely by the transmission casing. Integrally or otherwise formed to rotate with the gear 20 is a driving cam 22 which is preferably of the heart shaped variety for the purpose of providing uniform rates of follower acceleration and deceleration and to produce a smoothly operating mechanism characteristic of cams of this type.

Engageable with the peripheral surface of the cam 22 is a follower 23. The hub of the follower is loosely positioned for rotation about the axis of a driven shaft 24 which is mounted for rotation in bearings 25 provided transversely in the transmission casing. The outer or free end of the follower is provided with a nose 26 arranged for engagement with the cam, as shown particularly in Figs. 3, 5 and 6, whereby upon the rotation of the cam, its throw will be such as to impart oscillatory motion to the follower. The position of the cam is such that the nose 26 tends to maintain itself in contact with the peripheral surface of the cam through the action of gravity, although if desired, this may be supplemented by the employment of a spring (not shown) for attaining positively similar ends. The outer or free end of the follower also carries a pivoted pawl 27 which is adapted to contact the peripheral teeth of a ratchet wheel 28.

The wheel 28 includes an elongated sleeve or hub 29 which surrounds the driven shaft 24, and while the ratchet wheel is adapted to rotate in unison with and impart power to the driven shaft, yet at a point exteriorly of the transmission casing, there is provided a shear pin 30 which extends through registering openings formed in the sleeve 29 and the driven shaft. Pins of this type are commonly employed in mechanical stoking apparatus and are used to relieve the transmission of excessive pressures which might be developed in the event the feed screw or auger 4 should become jammed and locked against rotation by the presence, for instance, of metallic or foreign particles accidentally present in the fuel. Under such conditions of excessive pressure, the pin 30 is shorn and the drive mechanism released. Convenient repairs may be made by removing the cap thimble 31 from around the projecting ends of the hub 29 and the shaft 24, thereby permitting of the convenient removal of the broken pin and the substitution of an intact one. The inner end of the driven shaft is preferably squared as at 32 and is received within a correspondingly formed socket 33 provided in the registering outer end of the screw conveyor 4.

It will be seen as the driving cam rotates, oscillatory motion will be imparted to the follower, and this motion is thence imparted by means of the pawl 27 to the ratchet wheel 28, thence to the driven shaft 24 and the screw conveyor 4. The latter is rotated in but one direction and reverse rotation is prevented by a second or locking pawl 34 pivotally mounted within the transmission casing. By the employment of the worm and worm gear together with the cam and the pivoted follower, a slow rate of rotary motion is imparted to the screw conveyor, yet permitting a relatively high speed operating motor to be utilized.

It is necessary in the operation of devices of this kind to vary the speed of rotation of the screw conveyor to secure different rates of fuel delivery to the grates 2 in accordance with changes in weather conditions and other factors. To procure this variation in speed on the part of the screw conveyor and yet to permit of the use of constant speed motor or prime mover as at 7, I have provided means within the transmission by which through simple manual adjustment, a number of different operating speeds on the part of the driven member can be readily obtained. To accomplish this, I have provided the cover plate 15 of the casing with a stub shaft 35, the outer end of which terminates in a finger engaging handle 36. This handle is equipped with a spring pressed ball or plunger 37 adapted for engagement with pockets or depressions 38 formed at intervals in the outer face of the plate 15. The plunger 37 engages with these depressions and thereby frictionally retains the shaft 35 in definite positions of adjustment.

The inner end of the shaft 35 is squared for the reception of the manually adjustable stop plate 39 whereby said plate is caused to rotate in unison with the shaft 35 and through the medium of the plunger 37 to retain its definite positions of adjustment as shown more particularly in Figs. 3 to 6 of the drawings. The plate 39 includes a corrugated or serrated edge 40 providing a plurality of pockets 41 which are arranged at different radial distances from the center of the shaft 35. The follower member 23 has its outer or free end provided with a transversely extending pin 42. The end of the pin is arranged in registration with the serrated edge 40 of the plate 39, and the purpose of this structure is to provide stop means for controlling at will the period of contact between the outer or free end of the follower and the cam, in order to vary the effective throw of the follower and its associated pawl 27 and at the same time the degree of rotation of the conveyor shaft with respect to each complete revolution of the driving cam. Thus, as shown in Fig. 3, the stop plate occupies a position wherein the nose 26 of the follower may contact with the driving cam throughout the complete period of revolution of the cam, permitting the latter to impart its maximum throw or movement to the follower. When the stop plate is in the position set forth in Fig. 3, the screw conveyor is rotated to secure its maximum rate of feed. By shifting the stop plate to the position disclosed in Fig. 6, a somewhat reduced rate of feed is imparted to the screw conveyor since the follower does not contact with the peripheral edge of the cam during the full rotation of said cam but is engaged by one of the pockets of the stop plate so that for a part of its rotation, the cam is not in contact with the follower. Likewise in Fig. 5, there is disclosed a third position of the stop plate by which is secured an even lower rate of speed of rotation on the part of the driven shaft and its associated screw conveyor. Thus by controlling the period of contact between the follower and the driving cam, the desired rates of travel of the screw conveyor are obtainable. In Fig. 4, the stop plate occupies a position wherein the follower is completely removed from contact with the periphery of the driving cam so that the rotation of the latter does not impart any movement whatever to the conveyor. This position may be necessary in the event it is desired to operate the fan 17 for the purpose of completing the combustion of fuel delivered to the grate 2 without furnishing the grate with additional fuel.

In the modified form of the invention disclosed in Figs. 14, 15 and 16, a slip clutch of well known construction is used for effecting the movement of the feeding conveyor instead of the pawl and ratchet mechanism shown in the preferred form. To this end, the screw conveyor shaft 41 has attached for rotation therewith a sleeve 42 having a recessed cup member 43 secured to the inner end thereof. Attached to this cup and received partially therein is an expansion spring 44 which has its major portion arranged within a similarly recessed member 45 formed with a cam engaging arm 46. Upon the rotation of the cam 47, which is connected and driven by the gear 48, the arm 46 will be depressed and due to the direction of winding of the spring 44, the same will tend to uncoil, causing a frictional engagement between the outer surfaces of the spring coils and the recessed member 45. This frictional engagement will cause the spring 44 to rotatably follow the member 45 and as the spring is rigidly connected to the cup member 43 which in turn is secured to the conveyor shaft 41 by the sleeve 42, the shaft will thus be rotated in unison with the cam engaging arm 46 when the latter is rocked in a downward direction. Upon the upward or return movement of the arm 46, which is acted on by a spring structure 49, the spring 44 will tend to wind up and lose its grip upon the member 45 and prevent the shaft 41 from rotating in the opposite direction with said member. Thus it will be seen that by the reciprocatory movement of the arm 46 effected by the rotary movement of the cam 47, rotary movement will also be imparted to the shaft 41.

For regulating the movement of the screw conveyor shaft 41 to any desired feeding speed, the upward movement of the cam engaging arm 46 may be governed or limited by a stop finger 50 which is attached for movement with an operating arm 51 arranged exterior of the transmission housing. By positioning the finger 50 so that the projection 52 of the arm 46 will engage the same, the upward movement of the arm 46 will be arrested and thereby limit the effective engagement between the cam and the arm with the result that the shaft 41 will also be limited in its movement. The arm 51 to which the finger 50 is operatively connected may be held in any of its adjusted positions by a spring pressed pin 53 received within openings 54 provided in the transmission housing wall.

In view of the foregoing, it will be seen that the present invention provides simple, inexpensive and efficient variable speed transmission for producing intermittent travel to a driven member from a constant speed continuously rotating driving member and wherein through the provision of a simple manual control, means are present for effecting considerable variation in the speed of rotation of a driven member without correspondingly varying the speed of rotation of the driving member. The parts are so constructed and arranged that they are exceptionally strong, durable and substantially free from the possibility of breakage or failure of the working parts. The transmission preferably runs in a suitable lubricant so that wear and friction are reduced to a minimum.

What is claimed is:

In a variable speed transmission for mechanical stokers, a casing, a driving shaft journaled for rotation in said casing, a smooth faced cam mounted for rotation in said casing, speed reducing gearing arranged between said drive shaft and said cam for effecting constant rotation of the cam at a lower rate of speed than said driving shaft, a driven member including a ratchet wheel, a follower pivotally mounted about the axis of the ratchet wheel and having its free end arranged for continuous contact with said cam, a pivoted pawl carried by the free end of said follower and arranged in engagement with the teeth of the ratchet wheel, a pin carried by the free end of said follower, and manually adjustable stop means pivotally mounted in connection with said casing and including a cam shaped plate, said plate being formed with pockets in its edge adapted for selective engagement with said pin to control the period of engagement between said follower and said cam during each revolution of the cam about its axis.

In testimony whereof I affix my signature.
HAROLD B. DONLEY.